June 27, 1967 G. H. OTTAWAY 3,328,767

COMPACT DATA LOOKUP TABLES

Filed Dec. 31, 1963 5 Sheets-Sheet 1

INVENTOR
GERALD H. OTTAWAY

BY

Melvin P. Williams
ATTORNEY

FIG. 3

A →

B ↓

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 1 | 2 | 3 | 4 | 5 | 6 | 7 | 8 | 9 | 10 | 11 | 12 | 13 | 14 | 15 | 0! |
| 2 | 2 | 3 | 4 | 5 | 6 | 7 | 8 | 9 | 10 | 11 | 12 | 13 | 14 | 15 | 0! | 1! |
| 3 | 3 | 4 | 5 | 6 | 7 | 8 | 9 | 10 | 11 | 12 | 13 | 14 | 15 | 0! | 1! | 2! |
| 4 | 4 | 5 | 6 | 7 | 8 | 9 | 10 | 11 | 12 | 13 | 14 | 15 | 0! | 1! | 2! | 3! |
| 5 | 5 | 6 | 7 | 8 | 9 | 10 | 11 | 12 | 13 | 14 | 15 | 0! | 1! | 2! | 3! | 4! |
| 6 | 6 | 7 | 8 | 9 | 10 | 11 | 12 | 13 | 14 | 15 | 0! | 1! | 2! | 3! | 4! | 5! |
| 7 | 7 | 8 | 9 | 10 | 11 | 12 | 13 | 14 | 15 | 0! | 1! | 2! | 3! | 4! | 5! | 6! |
| 8 | 8 | 9 | 10 | 11 | 12 | 13 | 14 | 15 | 0! | 1! | 2! | 3! | 4! | 5! | 6! | 7! |
| 9 | 9 | 10 | 11 | 12 | 13 | 14 | 15 | 0! | 1! | 2! | 3! | 4! | 5! | 6! | 7! | 8! |
| 10 | 10 | 11 | 12 | 13 | 14 | 15 | 0! | 1! | 2! | 3! | 4! | 5! | 6! | 7! | 8! | 9! |
| 11 | 11 | 12 | 13 | 14 | 15 | 0! | 1! | 2! | 3! | 4! | 5! | 6! | 7! | 8! | 9! | 10! |
| 12 | 12 | 13 | 14 | 15 | 0! | 1! | 2! | 3! | 4! | 5! | 6! | 7! | 8! | 9! | 10! | 11! |
| 13 | 13 | 14 | 15 | 0! | 1! | 2! | 3! | 4! | 5! | 6! | 7! | 8! | 9! | 10! | 11! | 12! |
| 14 | 14 | 15 | 0! | 1! | 2! | 3! | 4! | 5! | 6! | 7! | 8! | 9! | 10! | 11! | 12! | 13! |
| 15 | 15 | 0! | 1! | 2! | 3! | 4! | 5! | 6! | 7! | 8! | 9! | 10! | 11! | 12! | 13! | 14! |

! = CARRY

FIG. 12

| | a | b | a/b | & | ⊻ | &/⊻ |
|---|---|---|---|---|---|---|
| 1 | 0 | 0 | 00 | 0 | 0 | 00 |
| 2 | 0 | 1 | 01 | 0 | 1 | 01 |
| 3 | 1 | 0 | 10 | 0 | 1 | 01 |
| 4 | 1 | 1 | 11 | 1 | 0 | 10 |

FIG. 13

| 1 | OPERAND | DECIMAL EQUIV. | BINARY 8 | 4 | 2 | 1 |
|---|---|---|---|---|---|---|
| 2 | A | 7 | 0 | 1 | 1 | 1 |
| 3 | B | 6 | 0 | 1 | 1 | 0 |
| 4 | $\overline{\text{A OR B}}$ | (8) | 1 | 0 | 0 | 0 |
| 5 | A & B | (6) | 0 | 1 | 1 | 0 |
| 6 | A PLUS B | 13 | 1 | 1 | 0 | 1 |

FIG. 4

A EXCLUSIVE OR B →

A&B ↓

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 1 | 2 | 3 | 4 | 5 | 6 | 7 | 8 | 9 | 10 | 11 | 12 | 13 | 14 | 15 |
| 1 | 2 | | 4 | | 6 | | 8 | | 10 | | 12 | | 14 | | 6 | |
| 2 | 4 | 5 | | | 8 | 9 | | | 12 | 13 | | | 0! | 1! | | |
| 3 | 6 | | | | 10 | | | | 14 | | | | 2! | | | |
| 4 | 8 | 9 | 10 | 11 | | | | | 0! | 1! | 2! | 3! | | | | |
| 5 | 10 | | 12 | | | | | | 2! | | 4! | | | | | |
| 6 | 12 | 13 | | | | | | | 4! | 5! | | | | | | |
| 7 | 14 | | | | | | | | 6! | | | | | | | |
| 8 | 0! | 1! | 2! | 3! | 4! | 5! | 6! | 7! | | | | | | | | |
| 9 | 2! | | 4! | | 6! | | 8! | | | | | | | | | |
| 10 | 4! | 5! | | | 8! | 9! | | | | | | | | | | |
| 11 | 6! | | | | 10! | | | | | | | | | | | |
| 12 | 8! | 9! | 10 | 11! | | | | | | | | | | | | |
| 13 | 10! | | 12! | | | | | | | | | | | | | |
| 14 | 12! | 13! | | | | | | | | | | | | | | |
| 15 | 14! | | | | | | | | | | | | | | | |

! = CARRY

FIG. 5

| 1 | OPERAND | DECIMAL EQUIV. | BINARY 8 | 4 | 2 | 1 |
|---|---|---|---|---|---|---|
| 2 | A | 7 | 0 | 1 | 1 | 1 |
| 3 | B | 6 | 0 | 1 | 1 | 0 |
| 4 | A ∀ B | (1) | 0 | 0 | 0 | 1 |
| 5 | A & B | (6) | 0 | 1 | 1 | 0 |
| 6 | A PLUS B | 13 | 1 | 1 | 0 | 1 |

NOT (A OR B) →

A & B ↓

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 15 | 14 | 13 | 12 | 11 | 10 | 9 | 8 | 7 | 6 | 5 | 4 | 3 | 2 | 1 | 0 |
| 1 | 0! | | 14 | | 12 | | 10 | | 8 | | 6 | | 4 | | 2 | |
| 2 | 1! | 0! | | | 13 | 12 | | | 9 | 8 | | | 5 | 4 | | |
| 3 | 2! | | | | 14 | | | | 10 | | | | 6 | | | |
| 4 | 3! | 2! | 1! | 0! | | | | | 11 | 10 | 9 | 8 | | | | |
| 5 | 4! | | 2! | | | | | | 12 | | 10 | | | | | |
| 6 | 5! | 4! | | | | | | | 13 | 12 | | | | | | |
| 7 | 6! | | | | | | | | 14 | | | | | | | |
| 8 | 7! | 6! | 5! | 4! | 3! | 2! | 1! | 0! | | | | | | | | |
| 9 | 8! | | 6! | | 4! | | 2! | | | | | | | | | |
| 10 | 9! | 8! | | | 5! | 4! | | | | | | | | | | |
| 11 | 10! | | | | 6! | | | | | | | | | | | |
| 12 | 11! | 10! | 9! | 8! | | | | | | | | | | | | |
| 13 | 12! | | 10! | | | | | | | | | | | | | |
| 14 | 13! | 12! | | | | | | | | | | | | | | |
| 15 | 14! | | | | | | | | | | | | | | | |

! = CARRY

United States Patent Office 3,328,767
Patented June 27, 1967

3,328,767
COMPACT DATA LOOKUP TABLES

Gerald H. Ottaway, Hyde Park, N.Y., assignor to International Business Machines Corporation, New York, N.Y., a corporation of New York Filed Dec. 31, 1963, Ser. No. 334,803
11 Claims. (Cl. 340—172.5)

ABSTRACT OF THE DISCLOSURE

The invention is disclosed in the environment of a computer capable of doing arithmetic and logical operations by the use of tables stored in a memory. Circuits are provided for accessing the table to calculate results as a function of operands.

This invention relates to data processing and more particularly to means for reducing the size of a table necessary for doing table lookup operations.

In the data processing art, the expedient of obtaining data from tables comprising memory storage locations has been used to save on expensive equipment which is otherwise required to perform computations, comparisons and other logical operations. A comprehensive system for performing arithmetic operations by table lookup is shown in a commonly owned patent of W. H. Rhodes et al. "Multiplying Computer," U.S. Patent No. 3,049,295 issued from application Ser. No. 77,120, filed Dec. 20, 1960. Therein, a pair of operands are retrieved from a memory apparatus, and these operands are combined so as to form a single address which will specify a particular part of a table to be accessed in order to perform the correct operation upon the operands. The base address of the table is determined by the operation to be performed. In said patent, results must be stored in the table for any possible combination of operands within the capacity of the particular system being utilized. Although this is a particularly efficient way of performing computational operations, the tables necessary to supply answers for every combination of inputs require a large amount of memory space.

Therefore it is the primary object of this invention to reduce the amount of storage capacity required for table lookup operations.

Another object is to provide a compact table for doing table lookup addition in a data processing system.

A further object is to provide simple means for manipulating addresses so as to provide compact addition in a table lookup data processing system.

Still another object is to provide an addition table arranged so that certain operands result in like answers which are equal to other table areas plus a carry.

This invention is predicated on the concept that many arithmetic answers (or other logical results) are equally applicable to several arithmetic questions (or other permeations of operands); in other words, that a result formed by combining a particular pair of operands in accordance with a particular combination is equal to the result obtained from performing the same combination on a different pair of operands.

In accordance with the present invention, a partial combination of the operands is effected prior to utilizing the operands in the formulation of an address; in accordance with a preferred embodiment, the partial combination is a combination inherent in the operation to be performed. In accordance with a more particular embodiment of the invention, addition may be performed by first logically combining the operands in AND circuits, OR INVERT circuits, and EXCLUSIVE OR circuits, thereby reducing the number of ultimate address operands which must be recognizable by the table so as to access locations storing necessary results.

The invention permits a considerable saving in memory space without unduly complicating the equipment necessary for doing table lookup arithmetic, and without significantly prolonging the time required for said equipment to perform a table lookup operation.

Other objects, features and advantages of the present invention will become apparent from the following more particular description thereof, as shown in the accompanying drawings.

In the drawings:

FIG. 2 therefore represents the prior art equivalent of the circuit of FIG. 1;

FIG. 3 is an illustration of a table for doing table lookup arithmetic in accordance with the prior art, as illustrated in FIG. 2;

FIG. 4 is an illustration of a table for performing table lookup arithmetic in accordance with the present invention, as disclosed in FIG. 1;

FIG. 5 is chart illustrating the principle of the table shown in FIG. 4;

FIG. 12 is a chart illustrating the mathematical basis for the saving in table storage space that results from the embodiment of FIGS. 4–7;

FIG. 13 is a chart illustrating the principle of the table shown in FIG. 11.

Figure 1:
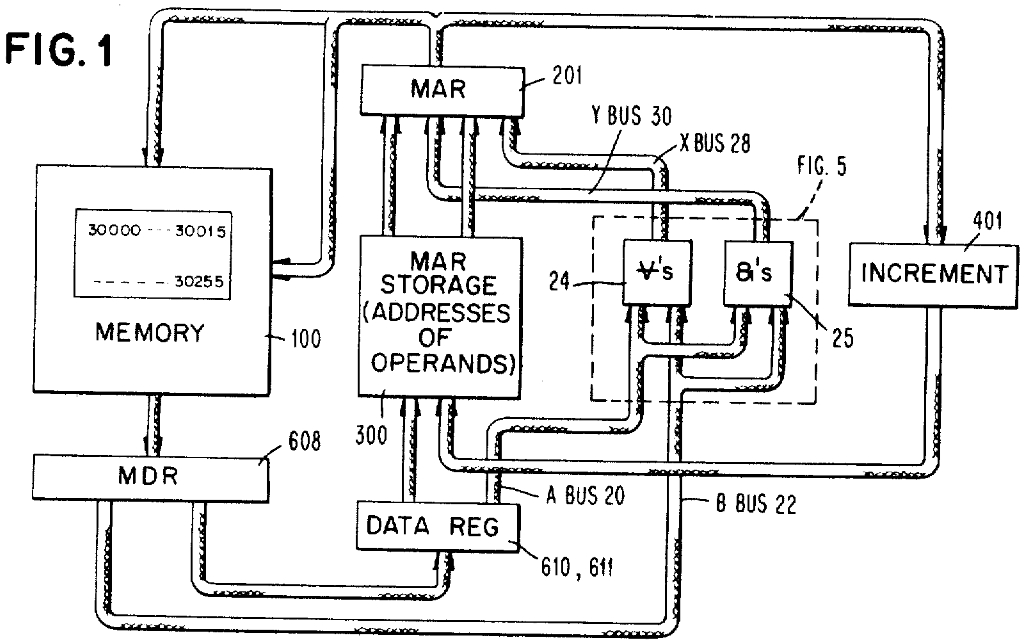
FIG. 1 is a simplified schematic block diagram of a device for doing simplified table lookup arithmetic utilizing compact addition tables in accordance with the present invention.
Figure 2:
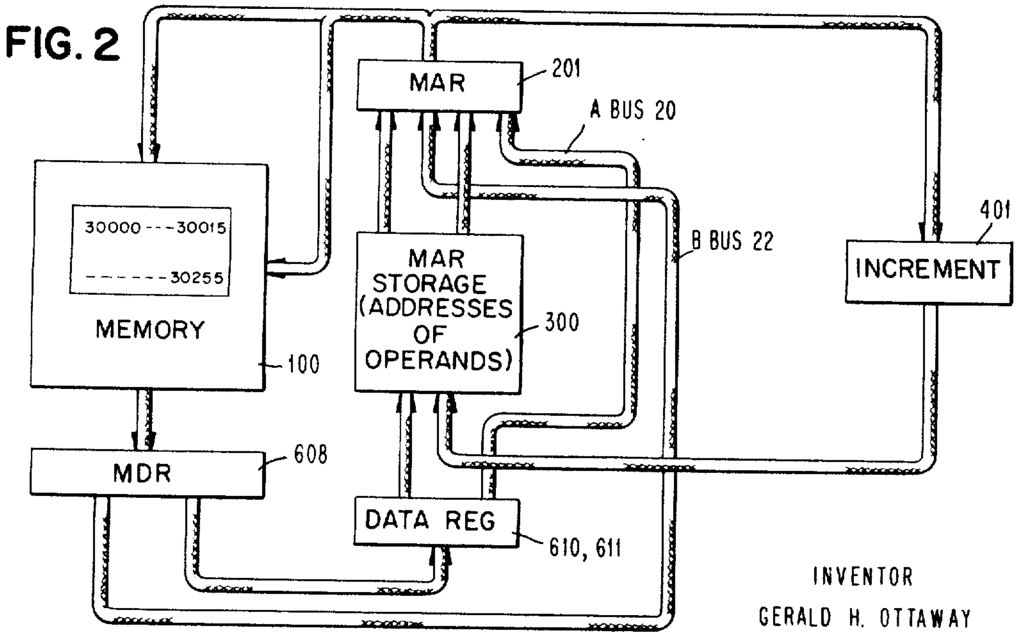
PRIOR ART FIG. 2
FIG. 2 is a simplified schematic block diagram of a device for performing table lookup operations in a manner similar to the device shown in FIG. 1, but without the improvement of the present invention.

Referring now to FIG. 1, the present invention contemplates providing address information to a memory address register (MAR 201) for controlling accessing of a memory 100, thereby to acquire in a memory data register (MDR 608) manifestations of the result of a table lookup operation. The memory 100 may also be accessed so as to cause the MDR 608 to provide the manifestations of operands to an A BUS 20 and a B BUS 22 directly or via a data register (such as the DRT and DRU registers 610, 611 in FIG. 1*a* of said patent). The manifestations of operands on the A BUS 20 and the B BUS 22 may be combined by EXCLUSIVE OR circuits 24 and AND circuits 25 so as to generate a low order address manifestation on an X BUS 28 and a high order address manifestations on a Y BUS 30 for use by the MAR 201 in accessing the memory 100 in accordance with the mode of operation as disclosed in said patent. The base address is supplied to the MAR storage unit 300 for defining the basic table within which a particular operation is to be performed; this base address being supplied from memory during the reading out of normal instructions which control the operation of the machine. Referring to FIG. 2, it will be observed that the only difference between the apparatus of FIG. 1 and the apparatus of FIG. 2 is the elimination of the EXCLUSIVE OR circuits 24 and the AND circuits 25; thus, the A BUS 20 and the B BUS 22 are applied directly to the MAR 201. The circuit of FIG. 2 therefore represents a simplified schematic block diagram of the device illustrated in FIG. 1*a* of said patent. Table lookup arithmetic may be performed by providing a table as shown in FIG. 3. In FIG. 3, an exclamation point (!) indicates that a carry will be generated in addition to the sum, the values of the sum being printed in said table. The uppermost horizontal row in FIG. 3 is equal to the decimal values of the operand A, and the left most column of FIG. 3 illustrates the various decimal values of the operand B. By going to a value for each operand, and finding the intersecting point, the summation of the particular operation may be achieved; for instance, six and seven equals 13, and by taking the column under $A=6$ and the row to the right of $B=7$, one finds that they intersect at a value of 13. It is obvious that many other combinations will result in an answer of 13. It is the object of this invention to reduce the number of like answers by providing a way of combining questions which result in the same answer into a common form, prior to doing the table lookup operation.

FIG. 4 illustrates a table which results by utilizing the circuitry briefly described in FIG. 1. There, for instance, there are approximately one quarter as many answers as are shown in FIG. 3 (of course, one does not find answers by visual inspection). The expression A EXCLUSIVE OR B is defined herein to mean the aggregate of each bit of an A operand expressed in binary form EXCLUSIVE OR'D with a comparable bit of a B operand expressed in binary form, in accordance with the table shown in FIG. 5. In FIG. 5, the above example of $A=7$ and $B=6$, is converted for use with the table of FIG. 4. The binary 8, 4, 2 and 1-bit are shown for a value of $A=7$ in line 2; these comprise the 4-bit, the 2-bit, and the 1-bit. Similarly, the B operand, having an equivalent decimal value of 6 (line 3) comprises binary 4-bit and 2-bit. In order to achieve the function A EXCLUSIVE OR B (line 4) it is necessary to take the 1-bit of A and EXCLUSIVE OR bit with the 1-bit of B; since B has no 1-bit, the EXCLUSIVE OR result is itself a 1-bit. The EXCLUSIVE OR of the A and B 2-bits is a 0 since both A and B do include a 2-bit. The EXCLUSIVE OR of the A and B 4-bits is also a 0 since both A and B do have a 4-bit. The EXCLUSIVE OF of the A and B 8-bits is a 0 since both are a 0. Thus, the expression on line 4 is equivalent to the value of A EXCLUSIVE OR B, which is 0001. This binary value has a decimal equivalent of 1 so that the first column of the table of FIG. 4 would be addressed by A EXCLUSIVE OR B when $A$ equals 7 and $B$ equals 6. Similarly, line 5 of the chart in FIG. 5 illustrates A & B; for the binary 1 bit, 1 & 0 equals 0; for the binary 2 bit, 1 & 1 is 1; for the binary 4 bit, 1 & 1 is 1; and for the binary 8 bit, 0 & 0 is 0. Thus, A & B (line 5) equals 0110, a decimal value of 6. This means that the sixth row of the table of FIG. 4 would be addressed by A & B when $A$ equals 7 and $B$ equals 6. In FIG. 4, the sixth row of the first column does have the correct answer, 13, stored therein.

Figure 6:
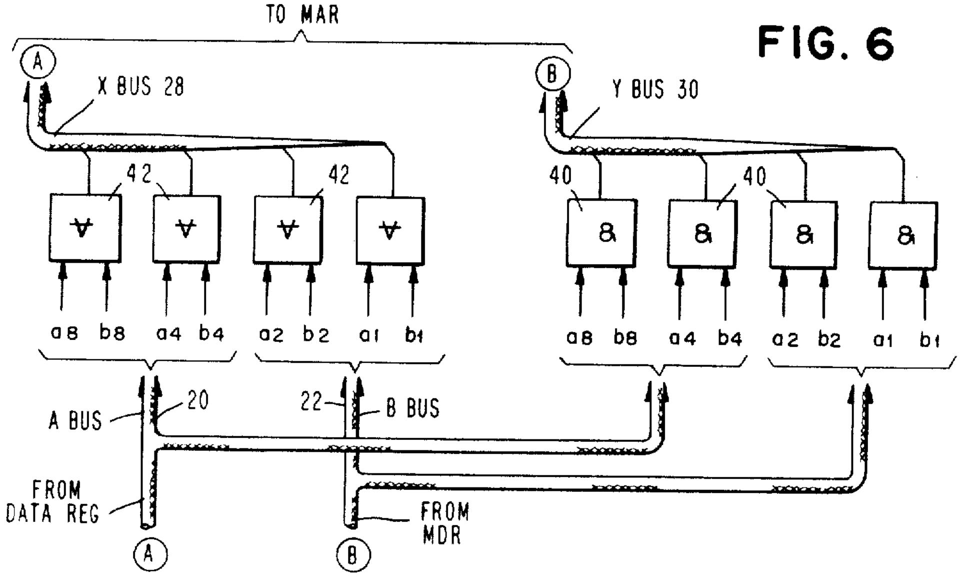
FIG. 6 is a detailed description of a circuit for converting a prior art table lookup device to a table lookup device in accordance with the present invention, said circuit being usable in the embodiment shown in FIG. 1.
Figure 7:
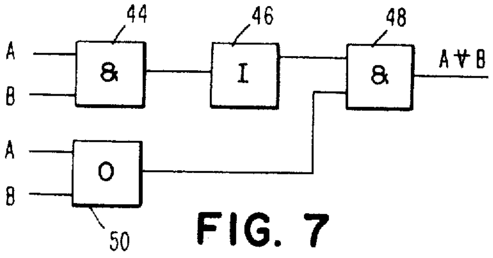
FIG. 7 is a schematic block diagram of an illustrative EXCLUSIVE OR circuit.
Figure 8:
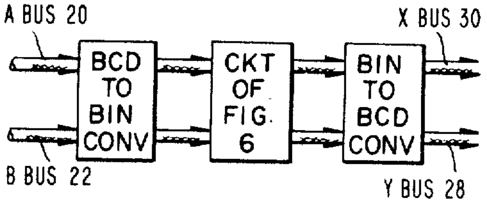
FIG. 8 is a block diagram illustrative of converting a BCD code to a pure binary coded relationship, and vice versa.

The details of equipment necessary for converting a regular table lookup device into a compact table lookup device in accordance with the present invention may vary, as will be described hereinafter. The equipment necessary in order to utilize the table of FIG. 4, in accordance with the addressing explained in the chart of FIG. 5, is shown in FIGS. 6 and 7. In FIG. 6, the A and B operands (of the type which might be utilized for a table of FIG. 3) are fed into a plurality of AND circuits 40 and EXCLUSIVE OR circuits 42 for combining the A and B operands. The table of FIG. 4 and the circuit of FIG. 6 illustrate an embodiment where four binary bits comprise each of the operands, the combination of these bits being on a bit by bit basis in accordance with the table of FIG. 5. Thus the regular addresses which would be apparent on the A BUS 20 and B BUS 22 would be converted into the EXCLUSIVE OR and & functions of FIGS. 4 and 5 by the EXCLUSIVE OR circuits 42 and the AND circuits 40, respectively. The output of the circuit of FIG. 6 on X BUS 28 and Y BUS 30 are applicable to regular addressing circuits of said patent. However, it is to be noticed that a four bit binary system is disclosed herein in order to clearly point out the mathematical table-saving relationships within the present embodiment, which is not so readily understood in terms of binary-coded-decimal (BCD) values. In the event that addressing circuits are not capable of responding to full, four-bit binary values on the X BUS and the Y BUS, a conversion from full binary to binary coded decimal, and a re-conversion, could be accomplished by a digital converting circuit of any well known type, of which there are many known in the art, as illustrated briefly in FIG. 8. Similarly, any AND circuit well known in the art could be utilized in FIG. 6 for the AND circuit 40. An exemplary EXCLUSIVE OR circuit for use in FIG. 6 is shown in FIG. 7. As is well known, the function of the EXCLUSIVE OR circuit is to generate an output signal if there is at least one, but less than all of the inputs; in this particular instance, two inputs are used, and there will be an output signal if there is one and only one input to the circuit. In FIG. 7, an AND circuit 44 will generate a signal if both of the inputs are present, and this is inverted by an inverter 46 for application to an AND circuit 48. The AND circuit 48 also responds to an OR circuit 50 which recognizes when either one of the inputs is present. Thus, the AND circuit 48 will generate an output signal, equal to A EXCLUSIVE OR B, whenever there is an output from the OR circuit 50 and no output from the AND circuit 44.

Figure 9:
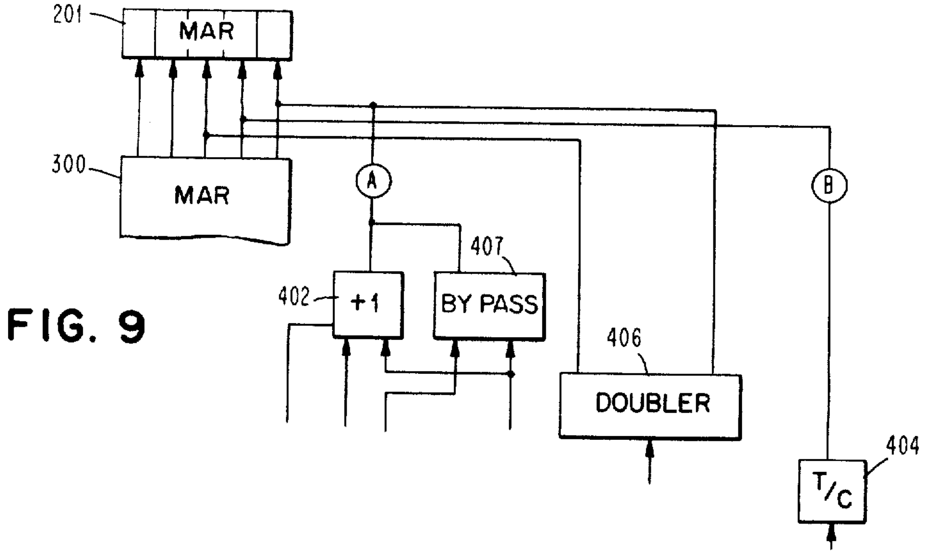
FIG. 9 is a schematic block diagram of a portion of FIG. 1*a* of U.S. Patent 3,049,295, illustrating exactly where the improvement of the present invention may be attached for incorporation therein.

The manner in which the circuit of FIG. 6 might be applied to the embodiment of said patent is shown in FIG. 9. FIG. 9 is a fragmentary reproduction of FIG. 1*a* of said patent with the letters A and B encircled at points in the circuit wherein FIG. 6 may be inserted. In other words, if the circuit of FIG. 1*a* of said patent had inserted therein, at the points marked by the letters A and B in FIG. 9 herein, the table of FIG. 4 (subject to use of the full binary code as described above), the present invention would be utilized in the system shown in said patent.

The saving which results from use of the embodiment of FIGS. 4–7 has a mathematical basis. Considering two operands of one binary bit each, each of the operands may be a 1 or a 0. The combination of the two operands may be 00, 01, 10, or 11. However, the EXCLUSIVE OR of this combination of operands results in 0, 1, 1, or 0 respectively, and the & of this combination of operands results in 0, 0, 0, or 1, respectively. A combination of the & and the EXCLUSIVE OR results may yield 00, 10, 10, or 01, respectively. This is set out more clearly in the table of FIG. 12 wherein values of $a$ and $b$, the combination of $a/b$, $a$&$b$, and $a$ EXCLUSIVE OR $b$, and the combination of the &/EXCLUSIVE OR values are shown. The combination of $a/b$ result in four different values. The AND function results in only two and the EXCLUSIVE OR function results in only two; a combination of &/EXCLUSIVE OR result in three different values, since the values in row 2 and row 3 are identical. Thus, using the combination &/EXCLUSIVE OR instead of the combination $a/b$ means that here are only three different inputs per bit instead of four different inputs per bit. Thus, a two bit address table need only have three answers instead of four. By extending this, a pair of four bit operands, which would normally utilize 256 locations (as shown in FIG. 3) would only require 81 locations (as shown in FIG. 4), since the ¾ of a table necessary may be multiplied by the number of bits in each operand:

$$3/4 \times 3/4 \times 3/4 \times 3/4 = \frac{81}{256}$$

The saving in table space in accordance with the embodiment of FIGS. 4–7 is not merely empirical, but rather can be shown to be based on—the mathematics involved in addition, in comparison with the mathematical basis of the logical operations which are performed by the EXCLUSIVE OR circuit and by the AND circuit. Considering a pair of single-bit operands, it is well known that the addition of the two bits may be achieved by using an AND circuit to achieve a raw carry, and using an EXCLUSIVE OR circuit to achieve a raw sum (this of course does not take into account carries from any other adder stages which would be used if multi-bit operands were involved). When two different operand sets result in the same address in the present embodiment, it is obvious that the sums of these operand sets have to be equal. Taking a case where A*m* and B*m* are one pair of operands, A*n* and B*n* are another pair of operands and each of these include as many as four bits (which would be A*n*1, A*n*2, . . . A*n*4, etc.), then the addresses which result from combinations herein may be considered to be E*m*, D*m* and E*n*, D*n* respectively. It can be shown that if E*m* equals E*n* and D*m* equals D*n*, then the sum of A*m* plus B*m* equals the sum of A*n* plus B*n*, as follows:

$Am \forall Bm = Em$ $\quad Am \& Bm = Dm$ $An \forall Bn = En$ $\quad An \& Bn = Dn$ $Rm = (Am$ plus $Bm)$, is stored at location E*m*, D*m*

$Rn = (An$ plus $Bn)$, is stored at location E*n*, D*n*

$Rm$=result of addition of $Am$ and B*m* (excludes carry)

$Rn$=result of addition of $An$ and $Bn$ (excludes carry)

$Em = Am \forall Bm = f(Am1 \forall Bm1)(Am2 \forall Bm2) \ldots Am4 \forall Bm4)$ $Dm = Am \& Bm = f(Am1 \& Bm1)(Am2 \& Bm2) \ldots Am4 \& Bm4)$ (Similarly for E*n* and D*n*)

the partial sums=$S$ $Sm1 = Am1 \forall Bm1$

.
.
.

$Sm4 = Am4 \forall Bm4$ $Sn1 = An1 \forall Bn1$

.
.
.

$Sn4 = An4 \forall Bn4$ the sub-carries=$C$ $Cm1 = Am1 \& Bm1$

.
.
.

$Cm4 = Am4 \& Bm4$ $Cn1 = An1 \& Bm1$

.
.
.

$Cn4 = An4 \& Bn4$ $Rm = Rm1 + Rm2 \ldots + Rm4$ $Rn = Rn1 + Rn2 \ldots + Rn4$ $Rm1 = Sm1$ $Rm2 = Sm2$ plus $Cm1$ $Rm3 = Sm3$ plus $Cm2$ $Rm4 = Sm4$ plus $Cm3$ (Similarly for R*n*1 . . . R*n*4)

this, $Rm = Am1 \forall Bm1$ plus $(Sm2$ plus $Cm1)$ plus $(Sm3$ plus $Cm2)$ plus $(Sm4$ plus $Cm3)$ $Rm = \Sigma(Am1 \forall Bm1(Am \forall Bm2)(Am1 \& Bm1)(Am3 \forall Bm3)(Am2 \& Bm2)(Am4 \forall Bm4)(Am3 \& Bm3)$ where $\Sigma$ signifies arithmetic summation.

(Similarly for R*n*)

Total answer equals R together with the carry out, the carry out$= Cm = (Cm4)$OR$(Sm4 \& Cm3)$ Since $Em1 = Sm1$ and $Dm1 = Cm1$, etc., and since $Dm1 = Dn1$, (in this case), then $Sm1 = Sn1$, etc.

Since $Sm1 = Sn1$, etc., then $$Rm = Rn$$
$$Cm = Cm$$
and
$$Am \text{ plus } Bm = An \text{ plus } Bn$$

In conclusion, the summation of two operands can be completely expressed in terms of the components of each operand and the AND and EXCLUSIVE OR functions of like components of the two operands. This being so, addresses which are similarly expressed will many cases be equal if the operands of one set total the same value as the operands of another set.

Thus, there is a definite mathematical relationship involved, the mathematics of the logic being utilized (or combining the operands to achieve addresses of a compact table) being logical components of an arithmetic operation.

Figures 10, 11:
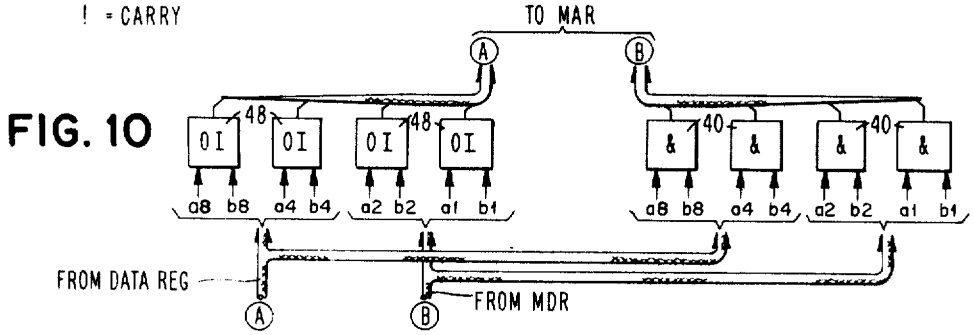
FIG. 10 is a schematic block diagram of an alternative circuit, for converting a prior table lookup device to a device in accordance with the present invention, suitable for use within the embodiment illustrated in FIG. 1.
FIG. 11 is an illustration of a table for doing table lookup arithmetic in accordance with the embodiment of FIG. 1 utilizing the circuit of FIG. 10.

An additional table which may be utilized in accordance with a second embodiment of the present invention is shown in FIG. 11. Therein, the negative of A OR B is utilized as one address, and the A & B function is utilized as the other address in the same way as it is utilized in FIG. 4. This may be achieved by the circuit of FIG. 10 (which is similar to the circuit of FIG. 6) inserted into FIG. 1*a* of said patent. In FIG. 10, AND circuits 40 remain the same as FIG. 6; however, instead of using EXCLUSIVE OR circuits 42 (FIG. 6) this embodiment would utilize inverting OR circuits which are called OR INVERT circuits. In FIG. 10 a plurality of OR INVERTS 48 will each generate an output signal provided there is absolutely no input to that particular stage. This is the well known OR INVERT function, and is known to be equivalent to the function NOT A AND NOT B.

In the table of FIG. 11, the operands are combined to generate an A & B address which is to be utilized with a NOT (A OR B) address. The manner in which these addresses are formulated is illustrated more clearly with respect to FIG. 13, which is similar to the previously described FIG. 5. In FIG. 13 if $A$ equals 7 (binary 0111) and $B$ equals 6 (binary 0110), then NOT (A OR B) equals binary 1000 (decimal 8), and $A$ & $B$ equals 6 (binary 0110), as in FIG. 5. The result, $A$ plus $B$, equals 13 (as in FIG. 5) and it will be seen that by going to the eighth column and the sixth row, the result 13 is found in the table of FIG. 11. By comparing FIG. 11 with FIG. 4 it is obvious that the two tables are different, but that they are of the same size. This is true because the same relationship exists in the case of the embodiment of FIGS. 10 and 11 as it does in the embodiment of FIGS. 4–7; that is, only ¾ as much table is necessary for each bit of the operands in the embodiment of FIGS. 10 and 11 as would be necessary in the prior art as shown in FIG. 3.

In the tables of FIGS. 4 and 11, the results stored in each location of rows 8 through 15 include carries. In FIG. 4, these rows are (with the exception of the carry) equal to the like columns of rows 0 through 7. Therefore, by using the binary 8-bit as a carry indication only, the table of FIG. 4 could be again reduced by one third, requiring only 54 out of 256 possible locations. In FIG. 11, rows 8 through 15 are equal (with the exception of the carry) to columns 8 through 15. Thus, the 8-bit could sense a carry, and also be added to the otherwise-generated function of NOT (A OR B) to eliminate rows 8 through 15.

Thus, the present invention permits use of tables with repeating segments together with an easily sensed carry indication.

Thus there has been described a relatively simple and inexpensive method for converting ordinary table lookup operations so as to achieve considerable savings in space within the table storage area. Although the tables shown in FIGS. 4 and 11 are rather spotty, the storage locations shown blank in those tables could be utilized in many data processing storage systems wherein long sequences of addresses are not necessary. Particularly, in what is now known as "read only memory" circuits, which circuits are actually large decoding networks, any particular operation may be performed with any particular known address, and all individual units of storage may be utilized, whether or not they are interleafed with storage locations of tables or of data relating to other operations. Thus, the savings shown in the tables of FIGS. 4 and 11 are very realistic in modern data processing equipment.

Only two different embodiments of the improvement in accordance with the present invention have been shown; however, other combinations of operands, and particularly, of operands which are related to arithmetic being performed, may be utilized to simplify tables in accordance with the present invention. Other examples include using A (or B) as one operand and A EXCLUSIVE OR B as another operand; similarly A OR B may be utilized with A & B. Many other examples could be given, there being no limit to the manner in which operations can be performed with compact tables by means of partial initial combinations.

While the invention has been shown and described with respect to preferred embodiments thereof, it should be understood by those skilled in the art that the foregoing and other changes in the combinations utilized and in the form and details of the apparatus may be made without departing from the spirit and the scope of the invention.

What is claimed is:

1. In a data processing system of the type having a memory means with a plurality of addressable locations therein, each location storing manifestations of results which are obtainable by combining data manifestations in accordance with a particular relationship, said system having a source of data manifestations, said system also having address means including means responsive to addressing signals for accessing particular storage locations in said memory means, a table lookup control means, comprising:

means responsive to said source of data manifestations for performing at least one type of logical operation on said manifestations, and for generating combination signals indicative of the operations performed, said logical operation being among the group including the AND function, the EXCLUSIVE OR function and the OR INVERT function;

and means for causing said address means to respond to said combination signals.

2. The device described in claim 1 wherein said logical function performing means is an AND circuit.

3. The device described in claim 1 wherein said logical function performing means is an EXCLUSIVE OR circuit.

4. The device described in claim 1 wherein said logical function performing means is an OR INVERT function device.

5. The device described in claim 1 wherein a plurality of said manifestations are combined, and wherein said logical function performing means includes both AND circuits and EXCLUSIVE OR circuits.

6. The device described in claim 1 wherein a plurality of said manifestations are combined, and wherein said logical function performing means includes both AND circuits and OR INVERT circuits.

7. A system for obtaining data results as selected functions of data operands by means of compact data lookup tables, wherein the number of locations in such tables are less than the number of locations which may be specified by such data operands, including:

a memory having a plurality of addressable locations for storing groups of data manifestations, selected ones of said groups comprising tables;

addressing means, connected to said memory and responsive to different combinations of address manifestations, for accessing groups of data manifestations corresponding to unique combinations of address manifestations;

register means, connected to said memory, for receiving groups of data manifestations accessed by said addressing means;

and logic means, connecting said register means and said addressing means, operable to receive groups of data manifestations, representing data operands having a number of possible values, for supplying a number, less than the number of possible values of said data operands, of combinations of address manifestation groups for accessing corresponding groups in said tables.

8. The system claim 7, wherein:

the groups of data manifestations located in said tables represent data results which are a mathematical function of data operands, and the logic means supplies the same combinations of address manifestation groups for groups of data operands representative of data manifestations ultimately giving the same data result.

9. The system of claim 8, wherein:

each group of data manifestations received by said logic means represents a plurality of data operands and each data operand has a plurality of values.

10. The system of claim 9, wherein:

said logic means receives pairs of data operands;

the mathematical function represented by the table is arithmetic, and the logic means comprises circuits performing a plurality of functions selected from among the AND function of the data operands, the EXCLUSIVE OR function of the data operands, the OR function of the data operands, the data operands and negations of all the foregoing.

11. The system of claim 10, wherein:

addition is represented by the tables, and the logic means comprise a pair of circuits selected from the class of circuit pairs including: AND and EXCLUSIVE OR, and AND and NOT OR.

References Cited

UNITED STATES PATENTS

| | | | |
|---|---|---|---|
| 3,034,720 | 4/1962 | Taylor ---------- | 340—172.5 X |
| 3,196,260 | 7/1965 | Pugmire ------------ | 235—173 |
| 3,199,085 | 8/1965 | Rhodes et al. ------ | 340—172.5 |
| 3,229,078 | 1/1966 | Boland et al. ---- | 340—172.5 X |
| 3,274,562 | 9/1966 | Strawbridge ------- | 340—172.5 |

ROBERT C. BAILEY, *Primary Examiner.*

P. L. BERGER, P. J. HENON, *Assistant Examiners.*